US011574553B2

(12) United States Patent
 Daley et al.

(10) Patent No.: US 11,574,553 B2
(45) Date of Patent: Feb. 7, 2023

(54) FEELING EXPERIENCE CORRELATION

(71) Applicant: International Business Machines Corporation, Armonk, NY (US)

(72) Inventors: Stan Kevin Daley, Atlanta, GA (US); Michael Bender, Rye Brook, NY (US); Siddhartha Sood, Indirapuram (IN); Shawn D. Hennessy, Lisbon, ME (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 16/575,245

(22) Filed: Sep. 18, 2019

(65) Prior Publication Data
 US 2021/0082304 A1 Mar. 18, 2021

(51) Int. Cl.
 *G10L 25/90* (2013.01)
 *G10L 25/63* (2013.01)
 *G09B 19/00* (2006.01)
 *G06F 3/01* (2006.01)
 (Continued)

(52) U.S. Cl.
 CPC .............. *G09B 19/00* (2013.01); *G06F 3/011* (2013.01); *G06V 40/174* (2022.01); *G09B 9/00* (2013.01); *G10L 25/63* (2013.01); *G10L 25/90* (2013.01); *G06F 2203/011* (2013.01)

(58) Field of Classification Search
 CPC .......... G09B 19/00; G09B 9/00; G06F 3/011; G06F 2203/011; G06V 40/174; G06V 40/15; G06V 40/10; G06V 40/20; G10L 25/63; G10L 25/90
 See application file for complete search history.

(56) References Cited

U.S. PATENT DOCUMENTS

| 10,373,067 B1 * | 8/2019 | Chen ...................... G06N 20/00 |
| 2011/0167109 A1 * | 7/2011 | Papchenko ............ G06Q 10/10 709/203 |
| 2019/0107827 A1 | 4/2019 | Dhakshinamoorthy et al. |

(Continued)

FOREIGN PATENT DOCUMENTS

| CN | 105556506 B | 8/2018 |
| IN | 201817041099 A | 1/2019 |
| WO | 2018005270 A1 | 1/2018 |

OTHER PUBLICATIONS

Conner-Simons et al., "Detecting emotions with wireless signals", MIT News, Sep. 20, 2016, Retrieved from http://news.mit.edu/2016/detecting-emotions-with-wireless-signals-0920, 4 pgs.

(Continued)

*Primary Examiner* — Fariba Sirjani
(74) *Attorney, Agent, or Firm* — Peter K. Suchecki

(57) ABSTRACT

A system including sensors configured to provide physiological markers of a developer and a controller configured provide information indicative of a user experience to the developer while receive signals from the sensors. The controller is configured to utilize cognitive analysis determine developer emotion responses as the developer receives the user experience. The controller compares a developer emotion classification with a user emotion classification of a user as the user generated the user experience. The system generates a prioritized backlog to identify points where emotion responses between user and developer are in common, or where emotion responses between user and developer differ.

19 Claims, 5 Drawing Sheets

(51) Int. Cl.
  *G09B 9/00* (2006.01)
  *G06V 40/16* (2022.01)

(56) References Cited

U.S. PATENT DOCUMENTS

2019/0187782 A1* 6/2019 Liu .................. H04M 3/42161
2019/0355351 A1* 11/2019 Kim .................. B60W 50/087
2020/0310842 A1* 10/2020 Yen ..................... G06F 9/453

OTHER PUBLICATIONS

Slesar, "Emotion-Sensing Technology in the Internet of Things", Onix, Retrived on Jun. 11, 2019 from https://onix-systems.com/blog/emotion-sensing-technology-in-the-internet-of-things, 12 pgs.
Gage, "Introduction to Sentiment Analysis: What is Sentiment Analysis", Mar. 26, 2018, Retrieved from https://blog.algorithmia.com/introduction-sentiment-analysis/, 11 pgs.
Vorhies, "These IoT Sensors Want to Know How You Feel—and Maybe Even Change Your Mood", Aug. 23, 2016, Retrieved from https://www.datasciencecentral.com/profiles/blogs/these-iot-sensors-want-to-know-how-you-feel-and-maybe-even-change, 6 pgs.
Khazan, "This App Reads Your Emotions on Your Face", Jan. 15, 2014, Retrieved from https://www.theatlantic.com/technology/archive/2014/01/this-app-reads-your-emotions-on-your-face/282993/, 10 pgs.
Eid, M. "Requirement Gathering Methods," https://www.umsl.edu/~sauterv/analysis/F2015/Requirement%20Gathering%20Methods.html.htm, Nov. 2015, printed Dec. 3, 2019, 4 pgs.
Silver, S. "Design Thinking vs. Design Feeling," https://info.keylimeinteractive.com/design-thinking-vs.-design-feeling, Feb. 15, 2018, printed Nov. 27, 2019, 1 pg.
Unknown, "5 Ways Agile Helps Changing Requirements | LiquidPlaner," https://www.liquidplanner.com/blog/5-ways-agile-helps-manage-changing-requirements/, printed Dec. 3, 2019, 2 pgs.
Unknown, "Gathering and managing software project requirements," http://searchsoftwarequality.techtarget.com/essentialguide/Gathering-and-managing-software-project-requirements, Jan. 2015, printed Dec. 3, 2019, 5 pgs.
Unknown, Global IoT analytics market size from 2018 to 2022 (in billion U.S. dollars), https://www.statista.com/statistics/830549/worldwide-iot-analytics-market-size, printed Dec. 3, 2019, 6 pgs.
Unknown, "How to begin the software requirements gathering process: Elicitation and analysis techniques," http://searchsoftwarequality.techtarget.com/answer/How-to-begin-the-software-requirements-gathering-process-Elicitation-and-analysis-techniques, printed Dec. 3, 2019, 6 pgs.
Unknown, "Use elicitation techniques to discover software requirements," http://searchsoftwarequality.techtarget.com/feature/Use-elicitation-techniques-to-discover-software-requirements, printed Dec. 3, 2019, 3 pgs.
Unknown, "The Requirement Gathering Process—Challenges & How to Overcome Them—Appnovation," https://www.appnovation.com/blog/requirement-gathering-process-challenges-how-overcome-them, printed Dec. 3, 2019, 2 pgs.
Wright, C., "8 Tips to Capture Better Requirements for Your Software Project," https://www.cmswire.com/cms/web-cms/8-tips-to-capture-better-requirements-for-your-software-project-012470.php, Aug. 23, 2011, printed Dec. 3, 2019, 2 pgs.

* cited by examiner

FEELING EXPERIENCE CORRELATION

BACKGROUND

Some user-centric processes focus on seeking to understand the needs of end users and facilitating effective solutions to meet the needs. The processes obtain an accurate, user-centric understanding of potential issues that may be encountered from the user's point of view when implementing the solutions.

SUMMARY

In one example, the disclosure describes a system including one or more sensors, and a controller configured to: receive one or more signals indicative of one of more physiological marker of a developer from the one or more sensors, as the developer is provided with information indicative of a user experience of a user using the device or application, wherein the one or more signals are generated based on the developer receiving the indicative information in a substantially similar manner as the user using the device or application; generate a developer emotion classification based on the received one or more signals; compare the developer emotion classification with a user emotion classification generated by the user during creation of the user experience; and output a prioritized backlog based on the comparison of the developer emotion classification with the user emotion classification.

In one example, the disclosure describes a system comprising one or more sensors, a user interface, and a controller configured to provide a virtual reality simulation to a developer, wherein the virtual reality simulation simulates a user experience of a user interacting with a device or application, wherein the virtual reality simulation provided to the developer comprises a sensorial perception of a user while the user used a device or application, and wherein the virtual reality simulation requires the developer to exercise the same sensorial perception; receive one or more signals indicative of one or more physiological markers of the developer from the one or more sensors as the developer is provided with the virtual reality simulation; generate an initial emotion classification based on the received one or more signals; validate the initial emotion classification based on inputs to the user interface provided by the developer; generate a developer emotion classification based on the validation of the initial emotion classification; compare the developer emotion classification with a user emotion classification generated by the user during the interaction with the device or application; and output a prioritized backlog based on the comparison of the developer emotion classification and the user emotion classification.

In one example, the disclosure describes a computer-implemented method comprising: providing a developer with information indicative of a user experience of a user using a device or application, wherein the developer is provided with the indicative information in a substantially similar manner as the user using the device or application; receiving one or more signals from one or more sensors indicative of one or more physiological markers of the developer as the developer is provided with the indicative information; generating a developer emotion classification utilizing a computer, wherein the computer is configured to conduct a cognitive analysis of developer data, wherein the developer data based on the received one or more signals; comparing, using the computer, the developer emotion classification with a user emotion classification generated by a user during creation of the user experience; and creating, using the computer, a prioritized backlog based on the comparison of the developer emotion classification and the user emotion classification.

The details of one or more examples are set forth in the accompanying drawings and the description below. Other features, objects, and advantages will be apparent from the description and drawings, and from the claims.

DETAILED DESCRIPTION

Figure 1:
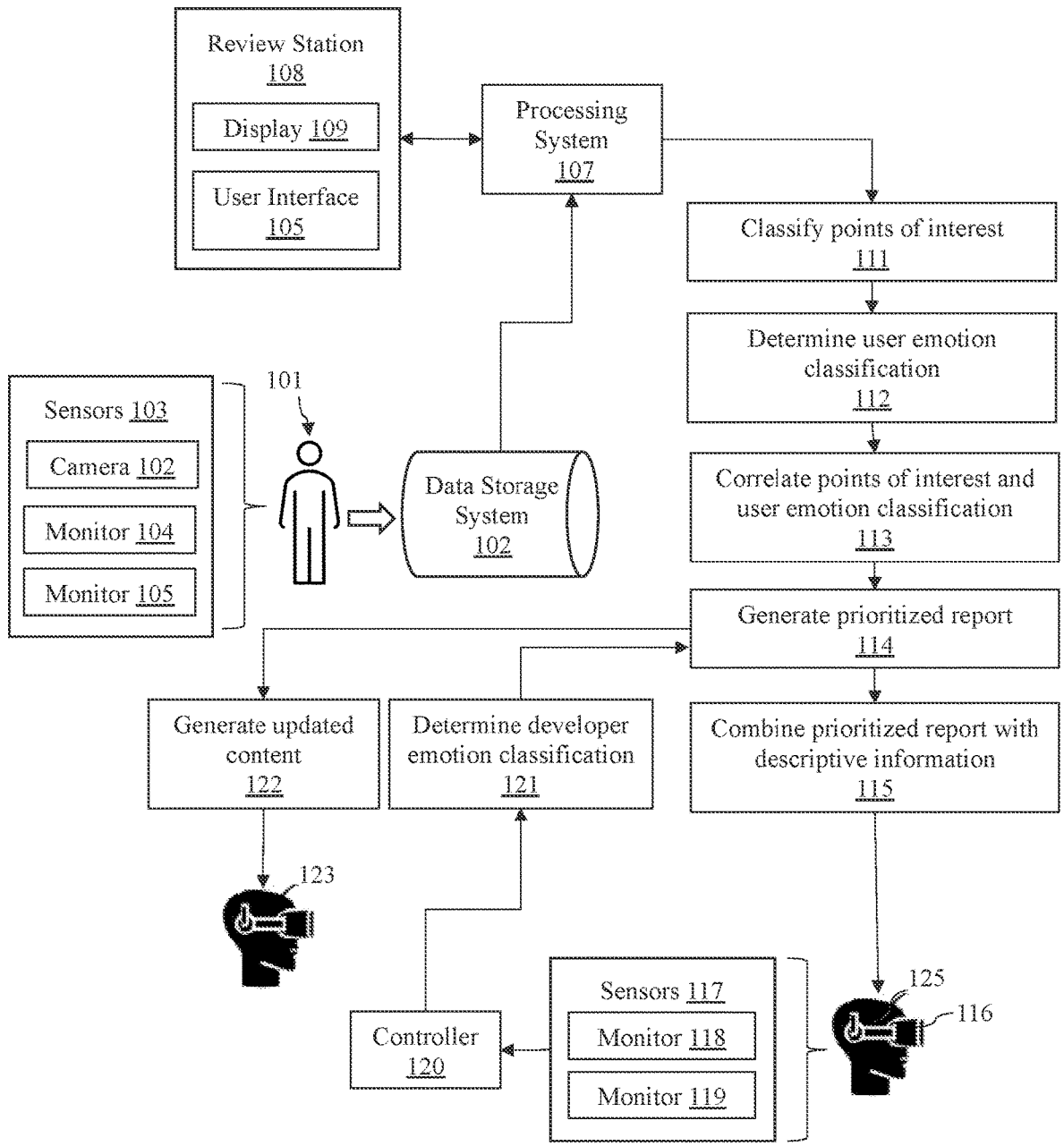
FIG. 1 illustrates a system for producing a prioritized backlog.

The disclosure provides a system and method whereby developers and designers of an article, application, or other activity requiring human interaction may gain insight into the advantages and potential shortcomings of the interaction, from the standpoint of a user. The system and method generally compare the emotion responses of the user fulfilling the requirements of the interaction with the emotion responses of a developer viewing or otherwise experiencing a reproduction of the user experience (for example, through a Virtual Reality simulation). Comparison of the emotion reactions of the user and the developer may allow recognition of whether a developer understands or empathizes with issues encountered by the user. The system and method may thereby provide valuable insights into a Design Thinking evaluation.

Design Thinking is a user-centric process which focuses primarily on seeking to understand the needs of end users, and facilitating effective solution to meet the needs. It is a generally solution-based approach seeking to foster an understanding of potential issues that may be encountered as a result of a required human interaction with an article or application under review. By centering and uncovering issues through investigation of required user interactions, it may find particular usefulness in the solution of problems that may be otherwise ill-defined or unknown.

One useful method of finding, determining, and solving ill-defined or unknown problems may be to observe or record the emotion responses of a typical user performing a specific activity. Unrecognized or ill-defined issues may become clear based on whether the user displays typically negative emotion responses at certain points in the activity (e.g., frustration). Similarly, successful implementations of procedural requirements may also be identified through analysis of the emotion responses, based on when the user displays typically positive emotions (e.g., happy, satisfied). However, a successful solution to the identified problems may require not only identification by the user, but also understanding and empathy from developers charged with providing resolutions.

The system disclosed herein may aid in both the identification and understanding necessary for the solution of unidentified or ill-defined issues encountered with articles or applications requiring a human interaction. For example, the system includes one or more sensors and a controller. The controller may include one or more processing circuits and therefore, the term controller should not be construed to mean a single processing circuit, but rather a combination of one or more processing circuits. The processing circuits may be in a common chip or may be distributed throughout the system.

The controller assesses the emotion responses of a user performing an assigned activity at specified points of interest, and compares it with developer emotion responses generated by a developer as the developer is provided with a reproduction or recreation of the user experience. The user experience is provided such that the developer may process the user experience in a substantially similar manner to the user, when the user conducted the assigned activity. For example, a developer may experience the user activity through a Virtual Reality (VR) simulation generated by the actions of the user conducting the assigned activity. Comparison of the emotion responses of the user and the developer provides an indication of whether a developer experiences and/or understands the particular emotion responses generated by the user while conducting the assigned activity. This comparison may identify particular points of interest where the emotion responses of the user and the developer are in common, indicating recognition and understanding by the developer of particular issues faced by the user, and may identify particular points where the emotion responses of the user and the developer diverge, indicating the issue may have an unrecognized degree of significance.

The controller may provide a manner of augmenting, for example, a design thinking workshop, by providing real life experiences of individuals engaged with previous versions of a product or prototypes. This may allow the design feeling emotional components to be experienced by individuals who may not have engaged in the product or have had different experiences with the product. The products may range from physical products to software interfaces to operational pain points related to security or some other process. The system may capture both positive and negative components, allowing an assurance that positive experiences are maintained while problematic issues are identified and resolved.

The controller utilizes a user experience to provide the real life experiences of individuals to one or more developers. A user generates the user experience through interaction with a product or application. The user is selected from a pool of volunteers informed and aware of the nature and type of data to be collected, as well as the subsequent emotion classifications conducted while generating the user experience. The user experience while interacting with the product or application is captured in a manner which may be provided to a developer, and in a manner through which the developer may experience the user interaction in a substantially similar manner to the user. For example, the user experience may be captured by video of the user performing the assigned activity, and provided to the developer as a VR simulation provided from the point-of-view of the user. Other aspects of the user experience may also be captured as the assigned activity is performed, such as sounds, haptic sensations, environmental conditions, physical restrictions, or any other descriptive information which provides context to the environment in which the user performed the assigned activity.

Additionally, as the user interacts with the product or application to generate the user experience, a collection of sensors may monitor various physiological markers of the user. The sensors may be configured to capture facial expressions, respiration, heart rate, blood pressure, temperature, perspiration, skin conductivity, or any other suitable physiological markers of the user. A controller receives the physiological markers and conducts a cognitive analysis of the physiological markers in order the determine the emotional responses of the user as the user conducts the activity. The cognitive analysis may classify the captured data into designated categories of emotion response (e.g., neutral state, surprise, happiness, sadness, frustration, anger, or any emotion ontology). The system associates the user's interpreted emotion responses with the various points in the assigned activity where the responses occurred, in order to identify points in the assigned activity where the user appeared, for example, satisfied, or frustrated, or neutral, or displayed some other emotion response. The user's interpreted emotion responses at the various points in the assigned activity are used to generate a user emotion classification describing the reactions of the user while conducting the assigned activity.

The user experience and the user emotion classification generated during the user's conduct of the assigned activity may be stored and made available to a developer for the purpose of, for example, design analysis of the assigned activity. The developer is selected from a pool of volunteers informed and aware of the nature and type of developer data to be collected as the developer receives and experiences the user experience, as well as the subsequent emotion classifications conducted using the developer data. A developer may receive information indicative of the user experience via, for example, a set of VR goggles, in order to gain insight into the user experience of the user as the assigned activity was conducted. The developer may receive the indicative information of the user experience in a substantially similar manner as the user received the information while performing the assigned activity. For example, the indicative information may comprise a visual reproduction or recreation of the visual perception of a user, and a developer may receive the indicative information in a substantially similar way by viewing the indicative information. The indicative information may comprise aural and/or haptic reproductions or recreation of the aural and/or haptic perceptions of a user, and a developer may receive the indicative information in a substantially similar way by hearing and/or feeling the indicative information. The indicative information reviewed by the developer may reproduce any sensorial information received by the user while conducting the assigned activity, and the developer may receive the indicative information in a substantially similar manner by receiving the indicative information using the same human sense as that utilized by the user while the user conducted the assigned activity.

As the developer receives the indicative information, a collection of sensors may monitor various physiological markers of the developer. The sensors may be configured to capture facial expressions, respiration, heart rate, blood pressure, temperature, perspiration, skin conductivity, or any other suitable physiological markers of the developer. A processing system receives the physiological markers of the developer and conducts a cognitive analysis of the physiological markers, to determine the emotional responses of the developer as the developer receives and experiences the user experience in a substantially similar manner to the user. The cognitive analysis may classify the developer data into designated categories of emotion response (e.g., neutral state, surprise, happiness, sadness, frustration, anger, or any emotion ontology). The developer's interpreted emotion responses at various points as the developer receives the information indicative of the user experience are used to generate a developer emotion classification, which may describe the reactions of the developer while receiving the user experience.

A processor may compare the developer emotion classification generated while the developer receives the user experience with the user emotion classification generated as the user conducted the assigned activity and generated the user experience. In examples, the developer emotion classification of the developer is compared with the user emotion classification at defined points of interest throughout the assigned activity. Comparison of the developer emotion classification and the user emotion classification generates a prioritized backlog of potential issues for resolution.

The comparison of the user emotion classification and the developer emotion classification may identify particular points of interest on the prioritized backlog where emotion responses between the user and the developer are in common (e.g., both apparently experienced "frustration" at a particular point in the assigned activity), or where emotion responses between the user and the developer differ (e.g., the user apparently experienced "frustration" at a particular point and developer apparently was "neutral.") The prioritized backlog may be provided to one or more developers, in order to evaluate whether the developers have a recognition of the issues which may be experienced by a user attempting an assigned activity. Correspondingly, the prioritized backlog may identify particular issues which may have had a previously unrecognized degree of significance, and/or identify particular issues where the developer's understanding of the user's emotion response is not fully understood, potentially indicating a need for additional investigation.

FIG. 1 illustrates a system 100 for producing the prioritized backlog. In FIG. 1, a user 101 performs an assigned activity while external and/or embedded sensors 103 provide visual and physiological data of user 101. The assigned activity may involve any activity which may be performed by user 101. For example, the assigned activity may a series of actions required by user 101 to retrieve or restock items in a particular warehouse environment. In another example, the assigned activity may be an interaction with a data processing system for entering, retrieving, or viewing particular data. In another example, the assigned activity may be performance of various steps of a particular security protocol. The assigned activity may comprise any action, sequence of actions, or subset of actions required to be performed by user 101 in order to complete the assigned activity.

The sensors 103 may include a camera 102 for capturing visual images of user 101 while conducting the activity, and may include one or more monitors 104 and 105 configured to capture one or more physiological markers of the user 101. The monitors 104 and 105 may be configured to capture data indicative of, for example, respiration, heart rate, blood pressure, temperature, perspiration, skin conductivity, or any other suitable physiological marker of user 101. The monitors 104 and 105 may comprise monitors in physical contact with user 101 such as monitor 105, and may comprise monitors remote from user 101, such as monitor 104. The assigned activity performed by user 101 may be any activity desired for evaluation by a developer. The activity may require any amount of physical or mental activity by user 101 to conduct or attempt the activity.

User data captured by sensors 103 as user 101 conducts the activity is stored by data storage system 106. The data stored in data storage system 106 may be referred to as captured data. Sensors 103 may communicate the user data to data storage system 106 using any technique, including via physical and/or wireless communications links. Data storage system 106 may be any type of data storage device configured to store user data provided and communicated by sensors 103, and may include any of various forms of volatile memory that may require being periodically electrically refreshed to maintain data in memory. Data storage system 106 may comprise an individual computing device, a plurality of computing devices, a computer server, a plurality of computer servers, or any device configured to store user data provided and communicated by sensors 103.

Captured data from data storage system 106 is provided to a processing system 107 configured to perform a cognitive analysis on the captured data stored in data storage system 106. The cognitive analysis performed by processing system 107 may classify the captured data into designated categories of emotion response (e.g., neutral state, surprise, happiness, sadness, frustration, anger). The cognitive analysis may use any emotion ontology in order to classify the captured data into designated categories. Processing system 107 may utilize any cognitive analysis and/or any type of affective computing technique to classify the captured data into designated categories of emotion response. In some examples, processing system 107 may be configured to utilize the captured data provided by data storage system 106 to recognize emotional information through the extraction of meaningful patterns from the captured data. Processing system 107 may be configured to utilize machine learning techniques to process different modalities, such as speech recognition, natural language processing, facial expression detection, body movement, and other physiological responses, in order to categorize the captured data into the designated categories of emotion response.

Processing system 107 may be configured with software, such as a set of instructions stored within an operatively connected memory, that when executed by the processing system 107 (e.g., processing circuitry), cause the processing circuitry to process the captured data acquired from data storage system 106 and perform the cognitive analysis. Processing system 107 is operatively connected to a memory, processing circuitry, and data transmission/receiving capabilities. Processing system 107 may be a single computing device, such as a desktop computer, handheld, or other mobile device, or a plurality of linked computing devices. Processing system 107 may include one or more devices distributed throughout cloud-based computing network.

User 101 may review the results of the cognitive analysis using, for example, a review station 108. At review station 108, user 101 may correct and/or supplement the cognitive analysis results through identification of misclassifications generated during the initial cognitive analysis by processing system 107 of the captured data provided by data storage system 106. User 101 may correct and/or supplement the cognitive analysis by interacting with processing system 107 at review station 108 using, for example, a visual display 109 and a user interface 110. The review station may be configured to provide a representation, reproduction, or recording of user 101 conducting the assigned activity, along with any emotion responses classified and indexed to specific points of the user activity by processing system 107. User 101 may review the representation, reproduction, or recording and the emotion responses indexed to the specific points and provide correction to the emotion responses assigned. Processing system 107 may update the cognitive analysis based on the inputs received via review station 108.

As will be discussed further below, system 100 classifies the captured data generated by sensors 103 into points of interest at operation 111, determines a user emotion classification at operation 112, correlates points of interest and the user emotion classification at operation 113, generates a prioritized report at operation 114, and combines the prioritized report with descriptive information at operation 115. Operations 111, 112, 113, 114 and/or 115 may be conducted by one or more computing devices operatively connected to a memory, processing circuitry, and data transmission/receiving capabilities. The one or more computing device may be a single computing device, such as a desktop computer, handheld, or other mobile device, or a plurality of linked computing devices, and may include one or more devices distributed throughout a cloud-based computing network. Operations 111, 112, 113, 114 and/or 115 may be conducted whole or in part by using processing system 107, and processing system 107 may comprise the one or more computing devices. Operations 111, 112, 113, 114 and/or 115 may represent a process that the one or more computing devices are configured to cause using processing circuitry, and/or may represent results generated by the processing circuitry and stored within one or more memories of the one or more computing devices. A computing device may include one or more processing circuits and therefore, the term computing device should not be construed to mean a single processing circuit, but rather a combination of one or more processing circuits. The processing circuits may be in a common chip or may be distributed throughout the system.

At operation 111, system 100 classifies the captured data generated by sensors 103 into points of interest defined for a specific design learning session, or as supplemented by user 101 or other actors who may have participated or observed user 101 performing the assigned activity. System 100 may use processing system 107 for this classification. The points of interest may include an identified action, an identified subset of actions, or an identified sequence of actions or other tasks which must typically be conducted by user 101 in order to complete the assigned activity. For example, the assigned activity for a user 101 might generally be the retrieval of requested items in a warehouse environment, and the points of interest during the assigned activity might include notification that the item needs to be retrieved, acknowledgement of the notification, retrieving information regarding the item location, travel to the item location, retrieval of the item from its storage location, and delivery of the item to a point of departure from the warehouse.

In another example, the assigned activity for a user 101 might generally be entry of new data or updated data in a data processing program, and the points of interest might include being informed that new or updated data is present, performing the administrative steps necessary for transmission of the new or updated data, retrieval of the new or updated data from the transmission, determination of whether the data is new or updated, formatting the new or updated information for entry, entering the new or updated information, and confirming that the new or updated information has been accepted by the data processing program. Other assigned activities with corresponding points of interest can be envisioned. Any activity to be performed by user 101 may be an assigned activity, and any action, subset of actions, and/or sequence of actions which the assigned activity requires may serve as identified points of interest.

At operation 112, system 100 determines a user emotion classification of user 101. System 100 may use processing system 107 for this determination. Operation 112 may determine the user emotion classification by evaluating portions of the captured data utilized to classify the emotion responses into the designated categories (e.g., neutral state, surprise, happiness, sadness, frustration, anger). System 100 may determine the user emotion classification based on comparison of the physiological markers indicated by user 101 during conduct of the assigned activity. For example, an analysis of the physiological markers comprising portions of the captured data categorized within, for example, the designated category "frustration" might establish a baseline level of "frustration" experienced by user 101 as user 101 conducted the assigned activity. System 100 may analyze all or some of the physiological markers comprising each emotion response designated as "frustration" in order to determine the relative degree of "frustration" each of the so designated emotion responses represents. In some examples, the relative degrees of emotion response may be determined using statistical methods on the captured data provided by sensors 103. In some examples, the relative degrees of emotion response may be determined based on, for example, subcategories of the emotion ontology utilized by the cognitive analysis employed (e.g., "sadness-active," "sadness-inactive," etc.), and/or combinations of emotion responses detected by the cognitive analysis (e.g., "surprise-happy," "surprise-frustrated," etc.). System 100 may be configured to use any technique for conduct of operation 112 in order to establish a gradient of the emotion response exhibited by user 101 during conduct of the assigned activity. Based on the gradient of the emotion response exhibited by user 101 for one or more of the designated categories of emotion response, operation 112 establishes the user emotion classification generated by user 101 as user 101 conducted the assigned activity. System 100 may utilize any cognitive analysis and/or any type of affective computing technique to establish the user emotion classification of user 101.

At operation 113, system 100 correlates the points of interest present at operation 111 and the user emotion classification determined at 112. At operation 114, system 100 generates a prioritized report of positive to negative experiences based on all or some portion of the user emotion classification and the identified points of interest specified for the assigned activity conducted. System 100 may use processing system 107 for the correlation of operation 113 and/or the generation of the prioritized report of operation 114. System 100 may utilize some or all of the identified points of interest to define specific experiences on the prioritized report, and may utilize the user emotion classification to identify any specific emotion responses of user 101 interpreted during conduct of each of the some or all identified points of interest by user 101.

In some examples, system 100 may be configured to use captured data stored in data storage system 106 to interpret a plurality of user emotion responses, where each user emotion response is an emotion response in an emotion ontology (e.g., neutral state, surprise, happiness, sadness, frustration, anger). System 100 may use processing system 107, any computing device, and/or any operation thereof. System 100 may be configured to index each user emotion response to a particular portion of the user experience generated by user 101, generating a plurality of indexed user responses. The particular portion of the user experience indexed with each user emotion response may be based on points of interest defined for an assigned activity (e.g., at operation 111). The user emotion classification may be based on the plurality of indexed user responses.

At operation 115, system 100 combines the prioritized report of positive to negative experiences of user 101 and the captured data of user 101 with descriptive information captured during user 101's performance of the assigned activity. The descriptive information may include, for example, video of user 101 performing the assigned activity. The descriptive information may include other stimulations experienced by user 101 as the assigned activity was performed, such as sounds, haptic sensations, environmental conditions, physical restrictions, or any other descriptive information which provides context to the environment in which user 101 performed the assigned activity. At operation 114, system 100 generates content which provides information indicative of the user experience of user 101 while user 101 performed the assigned activity. The indicative information may be, for example, an augmented reality or virtual reality simulation of user 101 performing the activity. The augmented reality or virtual reality simulation may be substantially from the visual point of view of user 101 (e.g., first person), or may be from some visual point of view located substantially separate from user 101 (e.g., third person). At operation 114, system 100 may utilize any technique in order to generate the information indicative of the user experience of user 101.

In an example, system 100 generates information indicative of the user experience of user 101, and the indicative information can be received by a second user such as a developer in a substantially similar manner as user 101 when conducting the assigned activity. For example, the indicative information may reproduce the visual information available to user 101 while conducting the assigned activity, and the visual information may be either from the point of view of user 101 or from a point of view separate from user 101. The second user may receive the indicative information in a substantially similar manner by viewing the reproduced visual information. The indicative information may reproduce any sensorial information received by user 101 while conducting the assigned activity, including aural, haptic, or any information perceived through typically human sensorial capacities, and the second user may receive the sensorial information in a substantially similar manner through receipt of the indicative information using the same human sense as that utilized by user 101. System 100, at operation 115, thereby creates information indicative of a user experience of a first user using a device or application which may be received by a second user such as a developer in a substantially similar manner to the first user using the device or application. Additionally, operation 115 correlates the prioritized report of positive to negative experiences generated by the first user to the information indicative of the first user's experience.

Here and elsewhere, "information indicative of a user experience" and "indicative information" means descriptive information which reproduces or recreates sensorial information received by a user such as user 101 and perceived through one or more sensorial capacities of the user while the user conducted the assigned activity. Receiving indicative information in a substantially similar manner means a developer and/or a second user is provided with the indicative information in a manner intended to reproduce or recreate the sensorial information received by the user while the user conducted the assigned activity, where the developer and/or second user additionally perceives the indicative information using the one or more sensorial capacities employed by the user. For example, the indicative information may comprise a visual reproduction or recreation of the visual perception of a user, and a developer may receive the indicative information in a substantially similar manner by viewing the indicative information. The indicative information may comprise an aural reproduction or recreation of the aural perceptions of a user, and a developer may receive the indicative information in a substantially similar manner by hearing the indicative information. The indicative information may comprise a haptic reproduction or recreation of the haptic perceptions of a user, and a developer and/or second user may receive the indicative information in a substantially similar manner by feeling the indicative information (e.g., perceiving through touch sense). The indicative information may reproduce any sensorial information received by the user while conducting the assigned activity, and the developer and/or second user may receive the indicative information in a substantially similar manner by receiving the indicative information using the same human sense as that utilized by the user while the user conducted the assigned activity.

As will be discussed further below, system 100 provides the indicative information to a developer, performs a cognitive analysis on the developer data with controller 120, determines a developer emotion classification at operation 121, and compares the developer emotion classification with the user emotion classification to generate a prioritized backlog. Any specific operations associated with or required for providing the indicative information, performing the cognitive analysis, determining the developer emotion classification, and the comparison to generate the prioritized backlog may be conducted by one or more computing devices operatively connected to a memory, processing circuitry, and data transmission/receiving capabilities. The one or more computing device may be a single computing device, such as a desktop computer, handheld, or other mobile device, or a plurality of linked computing devices, and may include one or more devices distributed throughout a cloud-based computing network. One or more of the specific operations may be conducted whole or in part by using processing system 107 and/or controller 120, and processing system 107 and/or controller 120 may comprise the one or more computing devices. One or more of the specific operations may represent a process that the one or more computing devices are configured to cause using processing circuitry, and/or may represent results generated by the processing circuitry and stored within one or more memories of the one or more computing devices. A computing device may include one or more processing circuits and therefore, the term computing device should not be construed to mean a single processing circuit, but rather a combination of one or more processing circuits. The processing circuits may be in a common chip or may be distributed throughout the system.

System 100 may provide the indicative information to a developer 125. Developer 125 may receive the indicative information using a device 116, such as a set of VR goggles, in order to gain insight into the user experience of user 101 as the assigned activity was conducted. A group of sensors 117 may include one or more monitors such as monitor 118 and monitor 119 configured to capture one or more physiological markers of the developer 125 as developer 125 receives the information indicative of the user experience of user 101. Monitors 118 and 119 may be configured to capture data indicative of, for example, respiration, heart rate, blood pressure, temperature, perspiration, skin conductivity, or any other suitable physiological marker of developer 125. Sensors 117 may comprise monitors in physical contact with developer 125 and may comprise monitors remote from developer 125. In an example, sensors 117 are configured to capture at least one specific physiological indicator such as a respiration rate, a heart rate, a blood pressure, a temperature, a perspiration, a skin conductivity, or any other measurable or ascertainable physiological indicator, and sensors 103 are additionally configured to capture the at least one specific physiological indicator. Developer 125 is selected from a pool of volunteers informed and aware of the nature and type of physiological markers and other data to be collected, as well as the subsequent emotion classification to be conducted while generating developer emotion responses.

Developer 125 receives the indicative information of the user experience of user 101 in a substantially similar manner as user 101 received the information while performing the assigned activity. As discussed, the indicative information may comprise a visual reproduction or recreation of the visual perception of user 101 during performance of the assigned activity, and developer 125 may receive the indicative information in a substantially similar manner by viewing the indicative information. The indicative information may comprise an aural reproduction or recreation of the aural perceptions of user 101 during the assigned activity, and developer 125 may receive the indicative information in a substantially similar manner by hearing the indicative information. The indicative information may comprise a haptic reproduction or recreation of the haptic perceptions of user 101 during the assigned activity, and developer 125 may receive the indicative information in a substantially similar manner by feeling the indicative information (e.g., perceiving through touch sense). The indicative information may reproduce any sensorial information received by user 101 while conducting the assigned activity, and developer 125 may receive the indicative information in a substantially similar manner by receiving the indicative information using the same human sense as that utilized by user 101 while user 101 conducted the assigned activity.

Sensors 117 produces signals reflective of one or more physiological markers of developer 125 as developer 125 receives the information indicative of the user experience of user 101, and provides the signals to a controller 120. The controller 120 is configured to interpret the signals from sensors 117 as developer data, and configured to perform a cognitive analysis on the developer data. The cognitive analysis of controller 120 performed on the developer data may be similar to and include common methodologies with the cognitive analysis conducted by processing system 107 on the captured data provided by data storage system 106. The cognitive analysis conducted by controller 120 may classify the developer data into designated categories of emotion response (e.g., neutral state, surprise, happiness, sadness, frustration, anger). The cognitive analysis of controller 120 may use any emotion ontology in order to classify the developer data into designated categories, including all or some portion of the emotion ontology utilized by processing system 107 to classify captured data into designated categories.

At operation 121, system 100 determines a developer emotion classification. Operation 121 may determine the developer emotion classification by evaluating portions of the developer data utilized to classify the emotion responses of the developer into the designated categories (e.g., neutral state, surprise, happiness, sadness, frustration, anger). System 100 may determine the developer emotion classification based on comparison of the physiological markers indicated by developer 125 as developer 125 receives information indicative of the user experience of user 101. Operation 121 performed on the developer data may be similar to and include common methodologies with the operation 112 conducted on the captured data provided by data storage system 106. Based on a gradient of one or more emotion responses exhibited by developer 125 as developer 125 receives the information indicative of the user experience of user 101, operation 121 establishes the developer emotion classification. System 100 may utilize any cognitive analysis and/or any type of affective computing technique to establish the developer emotion classification of developer 125.

System 100 compares the developer emotion classification generated by operation 121 with the user emotion classification generated by operation 112. In examples, system 100 compares the developer emotion classification and the user emotion classification based on the points of interest established by operation 111. Comparison of the developer emotion classification and the user emotion classification generates a prioritized backlog. At FIG. 1, generation of the prioritized backlog is illustrated as occurring within operation 114, however system 100 may accomplish the comparison in any manner.

For example, and as discussed, the assigned activity for user 101 might be the retrieval of requested items in a warehouse environment, with the points of interest including notification that the item needs to be retrieved, acknowledgement of the notification, retrieving information regarding the item location, travel to the item location, retrieval of the item from its storage location, and delivery of the item to a point of departure from the warehouse. System 100 might compare the developer emotion classification and the user emotion classification based on this assigned activity, and determine, for example, that both user 101 and developer 125 experienced "frustration" or some other negative emotion during a specific sequence performed for retrieval of items from a storage location. System 100 may be configured to then generate the prioritized backlog with the specific sequence indicated as a relatively high priority issue to be resolved, based on the similarities between the user emotion classification and the developer emotion classification. Alternately, system 100 might compare the developer emotion classification and the user emotion classification and determine, for example, that while user 101 experienced "frustration" during the specific sequence, developer 125 registered as "neutral," or some other generally non-negative emotion. System 100 may be configured to then generate the prioritized backlog with the specific sequence indicated as an issue where developer 125 may not fully understand the significance of the difficulties experienced by user 101.

The prioritized backlog thereby provides an indication of whether a developer experiences and/or understands the particular emotion responses generated by user 101 as user 101 conducted the assigned activity. As discussed, the user emotion classification of user 101 indicates the particular emotion responses (e.g., neutral state, surprise, happiness, sadness, frustration, anger) apparently indicated by user 101 as user 101 encountered the designated points of interest of the assigned activity. Similarly, the developer emotion classification results from developer 125 receiving information indicative of the user experience of user 101 via, for example, a virtual reality representation of the user experience. Comparison of the user emotion classification and the developer emotion classification may thus identify particular points of interest on the prioritized backlog where emotion responses between user 101 and developer 125 are in common (e.g., both apparently experienced "frustration" at a particular point in the assigned activity), or where emotion responses between user 101 and developer 125 differ (e.g., user 101 apparently experienced "frustration" at the particular point and developer 125 apparently was "neutral.") System 100 provides the prioritized backlog to one or more developers, in order to evaluate whether the developers have a recognition of the issues which may be experienced by user 101 as user 101 attempts to complete the assigned activity. Correspondingly, the prioritized backlog may identify particular issues which may have had a previously unrecognized degree of significance, and/or identify particular issues where the developer's understanding of the user's emotion response is not fully understood, potentially indicating a need for additional investigation.

In an example, system 100 combines the frequency, level of stress and understanding of the stress for each category of problem, enabling a prioritization of pain points through tagging or ranking to produce the prioritized backlog. Any content not understood by the developer may be also be categorized separately. System 100 may display a representation of the data providing one or more of the frequency of pain, the level of pain, and the developer understanding of the pain point.

System 100 may be configured to generate updated content at operation 122, where the updated content is based on the indicative information (e.g., the virtual reality simulation) of the user experience of user 101 while conducting the assigned activity, but with one or more portions of the indicative information altered, based on the correction of issues identified by the prioritized backlog. The system 100 may be configured to generate the updated content by altering the information indicative of the user experience to reflect a resolution of one or more issues on the prioritized backlog.

A user 123 (such as user 101, or another user) may then receive the altered indicative information and undergo an evaluation of emotion responses similar to that initially conducted for user 101, generating a revised emotion classification. Comparison of the initial user emotion classification and the revised emotion classification may indicate whether the correction of issues was acceptably effective. User 123 is selected from a pool of volunteers informed and aware of the nature and type of physiological markers and other data to be collected, as well as the subsequent emotion classification to be conducted while generating the updated emotion response. In an example, system 100 is configured to receive at least one signal from a specific sensor while user 123 is provided with the altered indicative information, where the specific signal is indicative of a specific physiological marker of user 123. The specific physiological marker may be one of the physiological markers sensed by sensors 103 during generation of the user emotion classification.

Controller 120 may be configured with software, such as a set of instructions stored within an operatively connected memory, that when executed by controller 120 (e.g., processing circuitry), cause the processing circuitry to process the developer data acquired via sensors 117 and perform a cognitive analysis of the developer data. Controller 120 includes an operatively connected memory, processing circuitry, and data transmission/receiving capabilities. Controller 120 may be a single computing device, such as a desktop computer, handheld, or other mobile device, or a plurality of linked computing devices, and may include one or more devices distributed throughout a cloud-based computing network. Controller 120 may comprise some part of processing system 107. Likewise, operation 121 may be conducted by one or more computing devices which include an operatively connected memory, processing circuitry, and data transmission/receiving capabilities. The one or more computing devicse may be a single computing device, such as a desktop computer, handheld, or other mobile device, or a plurality of linked computing devices, and may include one or more devices distributed throughout cloud-based computing network. Operation 121 may be conducted whole or in part using controller 120. Controller 120 may comprise the one or more computing devices. Operation 121 may represent a process that the one or more computing devices are configured to cause using processing circuitry, and/or may represent the results of the produced by the processing circuitry and stored within one or more memories of the one or more computing devices.

Figure 2:
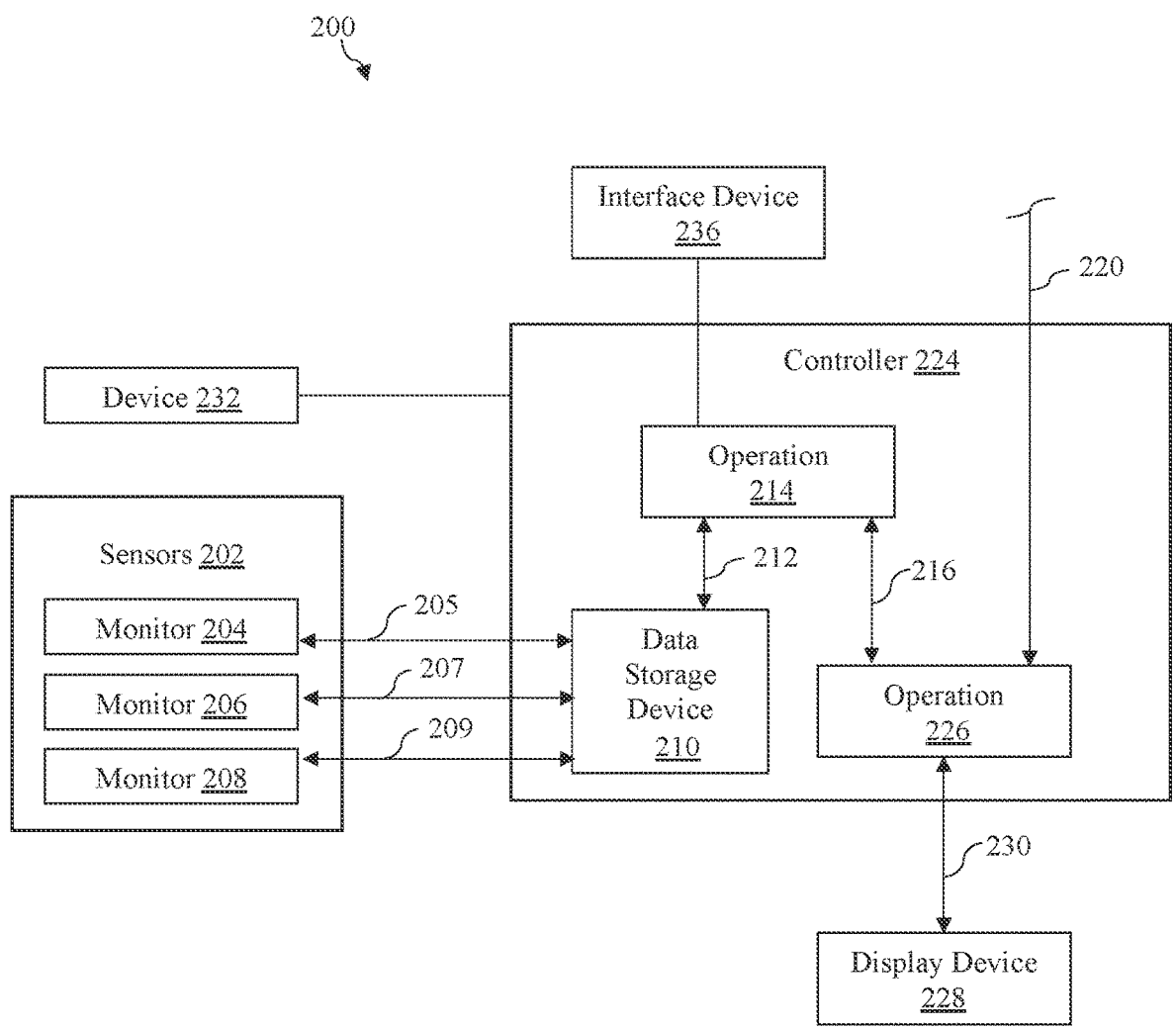
FIG. 2 illustrates a system for producing a prioritized backlog based on a developer emotion classification.

FIG. 2 illustrates a system 200 configured to utilize a user emotion classification of a user (such as user 101) generated by a system such as system 100 (FIG. 1). One function of system 200 is to provide a developer with information indicative of a user experience of a user using a device or application, while simultaneously reading one or more physiological markers of the developer. The developer receives the indicative information in a substantially similar manner as the user using the device or application when the user experience was generated. For example, the developer might receive visual information reproducing or recreating the visual stimulation received by the user during the user experience. The one or more physiological markers of the developer produced while the developer receives the indicative information are utilized to generate a developer emotion classification. System 200 compares the developer emotion classification with a user emotion classification generated by the user during creation of the user experience. The comparison may identify particular points of interest where emotion responses between the user and the developer are in common, or where emotion responses between the user and developer differ. System 200 may display a prioritized backlog produced by the comparison at an output device. The prioritized backlog may identify particular issues which may have had a previously unrecognized degree of significance, and/or identify particular issues where the developer's understanding of the user's emotion response is not fully understood, potentially indicating a need for additional investigation.

System 200 comprises one or more sensors 202 comprising, for example, monitors 204, 206, and 208. The monitors may be configured to capture data indicative of, for example, respiration, heart rate, blood pressure, temperature, perspiration, skin conductivity, or any other suitable physiological marker of a developer viewing a user experience. The monitors may be configured to be in physical contact with the developer, or may be configured to remain remote from the developer. Sensors 202 are configured to communicate one or more physiological markers sensed to a controller over a communication link. For example, monitors 204, 206, and 208 may each communicate one or more physiological markers sensed to a controller via communication links 205, 207, and 209 respectively. Any of communication links 205, 207, and 209 may be physical and/or wireless communication links. Any of communication links 205, 207, and 209 may comprise some portion of the controller.

System 200 further comprises a controller 224. Controller 224 is configured to receive signals indicative of one or more physiological markers of the developer from sensors 202. Controller 224 may be configured to receive signals indicative of one or more physiological markers from monitors 204, 206, and 208 via communication links 205, 207, and 209 respectively, and may be configured to receive the signals via physical and/or wireless communication links. Controller 224 may store the signals indicative of the one or more physiological markers in data storage device 210 as developer data. Data storage system 210 may be any type of data storage device configured to store user data provided and communicated by Sensors 202, and may include any of various forms of volatile memory that may require being periodically electrically refreshed to maintain data in memory. Data storage system 210 may comprise an individual computing device, a plurality of computing devices, a computer server, a plurality of computer servers, or any device configured to store user data provided and communicated by Sensors 202.

Controller 224 may obtain the developer data generated via sensors 202 from data storage system 210. Controller 224 may perform a cognitive analysis on the developer data. Controller 224 may also classify the developer data into developer points of interest. The developer points of interest may one or more of the points of interest defined for a user conducting an assigned activity to generate a user experience. Controller 224 may determine a developer emotion classification of a developer using the developer data. Controller 224 may correlate the developer points of interest and the developer emotion classification and determine a developer emotion response. Controller 224 may compare the developer emotion classification with a user emotion classification, generate validated reactions based on the comparison, and output a prioritized backlog based on the validated reactions.

The cognitive analysis of the developer data conducted by controller 210 may be similar to and/or share one or more of the techniques discussed for the cognitive analysis of processing system 107 on the captured data of data storage system 106 (FIG. 1). Controller 224 may retrieve the developer data from data storage system 210 and provide the developer data to operation 214 via, for example, communication link 212. Operation 214 may classify the developer data into designated categories of developer emotion response (e.g., neutral state, surprise, happiness, sadness, frustration, anger). Operation 214 may use any emotion ontology in order to classify the captured data into designated categories, and operation 214 may utilize any cognitive analysis and/or any type of affective computing technique to classify the developer data into designated categories of developer emotion response. Controller 224 may be configured with software, such as a set of instructions stored within an operatively connected memory, that when executed during operation 214, cause the processing circuitry to process the developer data acquired from data storage system 210 and perform the cognitive analysis.

Controller 224, at operation 214, may classify the developer data generated by sensors 202 into developer points of interest. The developer points of interest may one or more of the points of interest defined for a user conducting an assigned activity to generate a user experience. For example, the developer points of interest may include an identified action, an identified subset of actions, or an identified sequence of actions which must typically be conducted a user in order to complete an assigned activity comprising the user experience. Any activity performed by a user may be an assigned activity, and any action, subset of actions, and/or sequence of actions which the assigned activity requires the user to perform may serve as developer points of interest.

Controller 224 may determine a developer emotion classification using the developer data. The developer emotion classification of the developer data conducted by controller 224 may be similar to and/or share one or more of the techniques discussed for the emotion classification of processing system 107 on the captured data of data storage system 106 (FIG. 1). Operation 214 may determine the developer emotion classification by evaluating portions of the developer data utilized to classify the developer emotion responses into the designated categories (e.g., neutral state, surprise, happiness, sadness, frustration, anger). Operation 214 may determine the developer emotion response based on comparison of the physiological markers indicated by a developer during reception of information indicative of a user experience, when the developer receives the indicative information in a substantially similar manner to a user generating the user experience. For example, an analysis of the physiological markers comprising portions of the developer data categorized within, for example, the designated category "frustration" might establish a baseline level of "frustration" experienced by a developer as the developer receives the indicative information in the substantially similar manner, and may analyze all or some of the physiological markers of the developer comprising each developer emotion response designated as "frustration" in order to determine the relative degree of "frustration" each of the so designated developer emotion responses represents. Controller 234 may be configured to use any in order to establish a gradient of the developer emotion response exhibited by a developer. Based on the gradient of the developer emotion response exhibited by a developer for one or more of the designated categories of developer emotion response, operation 214 establishes the developer emotion classification. Controller 224 may utilize any cognitive analysis and/or any type of affective computing technique to establish the developer emotion classification.

Controller 224 may correlate the developer points of interest and the developer emotion classification. Operation 214 may utilize the developer emotion classification to identify any specific developer emotion responses of a developer interpreted while the developer receives indicative information reproducing or recreating a user's conduct of some or all of the developer points of interest.

System 200 may include an interface device 236 configured to allow a developer to review the results of the cognitive analysis conducted using the developer data. At interface device 236, a developer may review an initial emotion classification based on the developer data, and may validate the initial emotion classification by, for example, correcting and/or supplementing the initial emotion classification of the developer data. Operation 214 may subsequently generate the developer emotion classification based on the validation of the developer provided via interface device 236. User interface 236 may be configured to provide a representation, reproduction, or recording of user 101 conducting the assigned activity, along with any developer emotion responses classified and indexed as a result of the developer receiving the information indicative of the user experience in a substantially similar manner as the user. The developer may review the user experience and the developer emotion responses indexed to specific points of the user experience, and provide correction to the developer emotion responses assigned.

Controller 224 may receive a user emotion classification via, for example, communication link 220. Communication link 220 may be a physical and/or wireless communication link. Operation 226 may receive the developer emotion classification from operation 214 via, for example, communication link 216, and receive the baseline emotion response via, for example, communication link 220. Operation 226 may compare the developer emotion classification generated by operation 214 with the user emotion classification received. In examples, operation 226 compares the developer emotion classification and the user emotion classification based on the points of interests established for the user emotion classification and the developer points of interest utilized for the developer emotion classification. The points of interests established for the user emotion classification and the developer points of interest utilized for the developer emotion classification may have one or more specific points of interest in common. Comparison of the developer emotion classification and the user emotion classification generates a prioritized backlog.

Controller 224 may be configured to use the one or more signals received from sensors 202 to interpret a plurality of developer emotion responses, where each developer emotion response if an emotion response in an emotion ontology (e.g., neutral state, surprise, happiness, sadness, frustration, anger). Controller 224 may be configured to index each developer emotion response to a specific portion of the user experience provided to the developer, generating a plurality of indexed developer responses. The specific portion of the user experience indexed with each developer emotion response may be based on points of interest defined for an assigned activity conducted by a user such as user 101 during generation of a user emotion response (FIG. 1). The developer emotion response may be based on the plurality of indexed developer responses. Controller 224 may be configured to receive a user emotion classification based on a plurality of indexed user responses, and controller 224 may be configured to compare the developer emotion classification and the baseline emotion classification by comparing the plurality of indexed developer responses and the plurality of indexed user responses. Controller 224 may be configured to interpret the plurality of developer emotion responses using a specific emotion ontology, where the specific emotion ontology is based on an emotion ontology utilized to generate the plurality of user emotion responses.

The prioritized backlog provides an indication of whether a developer experiences and/or understands the particular emotion responses generated by a user as the user conducts an assigned activity. As discussed, the user emotion classification received via communication link 220 indicates the particular emotion responses indicated by a user as the user encounters the designated points of interest for an assigned activity. Similarly, the developer emotion classification results from a developer receiving information indicative of the user experience of the user, when the developer receives the indicative information in a substantially similar manner. Comparison of the user emotion classification and the developer emotion classification may identify particular points of interest on the prioritized backlog where emotion responses between the user and the developer are in common, or where emotion responses between the user and the developer differ. Controller 224 generates the prioritized backlog as an output. Controller 224 may provide the prioritized backlog to a display device 228 via, for example, communication link 230. The prioritized backlog may be provided to one or more developers, in order to evaluate whether the developers have a recognition of the issues which may be experienced by a user as the user attempts to complete the assigned activity. Correspondingly, the prioritized backlog may identify particular issues which may have had a previously unrecognized degree of significance, and/or identify particular issues where the developer's understanding of the user's emotion response is not fully understood, potentially indicating a need for additional investigation.

In some examples, system 200 comprises a device 232, such as a set of VR goggles, through which a developer may receive information indicative of a user experience of a user using a device or application. Sensors 202 may generate signals indicating one or more physiological markers of a developer as the developer receives the indicative information in a substantially similar manner as the user using the device or application.

Controller 224 may be configured with software, such as a set of instructions stored within an operatively connected memory, that when executed by controller 224 (e.g., processing circuitry), cause the processing circuitry to process the developer data acquired from data storage system 210 and perform the cognitive analysis. Controller 224 includes an operatively connected memory, processing circuitry, and data transmission/receiving capabilities. Controller 224 may be a single computing device, such as a desktop computer, handheld, or other mobile device, or a plurality of linked computing devices. Controller 224 may include one or more devices distributed throughout cloud-based computing network.

Operations 214 and 226 may be conducted by one or more computing devices which include an operatively connected memory, processing circuitry, and data transmission/receiving capabilities. The one or more computing device may be a single computing device, such as a desktop computer, handheld, or other mobile device, or a plurality of linked computing devices, and may include one or more devices distributed throughout cloud-based computing network. Controller 224 may comprise the one or more computing devices. The operations of controller 224 such as operations 214 and 226 may represent a process that the one or more computing devices are configured to cause using processing circuitry, and/or may represent results generated by the processing circuitry and stored within one or more memories of the one or more computing devices. One or more of the operations may be conducted whole or in part by controller 224. Controller 224 may comprise the one or more computing devices. One or more of the specific operations may represent a process that the one or more computing devices are configured to cause using processing circuitry, and/or may represent results generated by the processing circuitry and stored within one or more memories of the one or more computing devices. A computing device may include one or more processing circuits and therefore, the term computing device should not be construed to mean a single processing circuit, but rather a combination of one or more processing circuits. The processing circuits may be in a common chip or may be distributed throughout the system.

Figure 3:
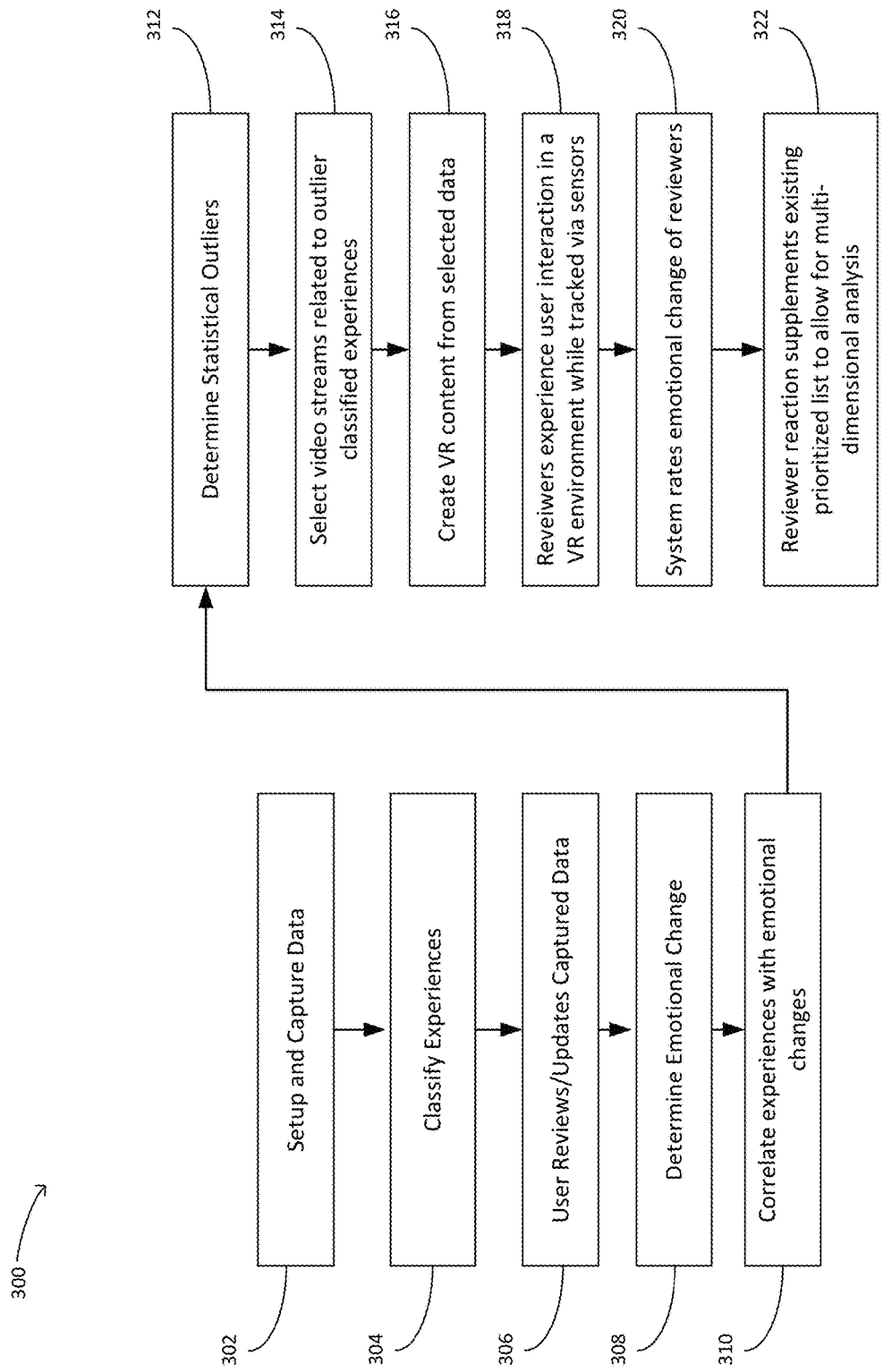
FIG. 3 illustrates an example method for comparing user and developer emotion responses.

FIG. 3 illustrates an example method 300 for using system 100 (FIG. 1) or system 200 (FIG. 2). In the example illustrated in FIG. 3, sensors 103 (FIG. 1) may be setup to provide physiological markers while user 101 conducts an assigned activity, and data storage system 106 may store the generated captured data based on the physiological markers sensed by sensors 103 (302). Processing system 107 (FIG. 1) may be used to classify the experiences of user 101, for example by performing a cognitive analysis on the captured data of data storage system 106 (304). Review station 108 may be utilized by a user 101 (FIG. 1) to review and update captured data (306). Processing system 107 (FIG. 1) may determine emotional changes based on the captured data using, for example, an operation similar to operation 112 to determine emotion responses of user 101 based on designated categories of an emotion ontology (308). Processing system 107 (FIG. 1) may correlate experiences with emotional changes by correlating points of interest present at operation 111 with the user emotion responses determined at 112 (310). Processing system 107 (FIG. 1) may determine statistical outliers by, for example, utilizing operation 112 to determine a gradient of emotion response exhibited by user 101 for one or more of the designated categories of emotion response (312).

Processing system 107 (FIG. 1) may select video streams related to the outlier classified experiences by, for example, utilizing operation 115 to combine the prioritized report of positive to negative experiences of user 101 with descriptive information captured during user 101's performance of the assigned activity (314). Processing system 107 may create VR content from selected data by, for example, utilizing operation 114 to generate content which provides information indicative of the user experience of user 101 while user 101 performed the assigned activity (316).

Device 116 (FIG. 1) may provide information indicative of the user experience of user 101 to a developer 125, as sensors 117 sense physiological markers of developer 125, and/or device 232 (FIG. 2) may provide information indicative of the user experience of user 101 as sensors 202 sense physiological markers of a developer (318). Controller 120 may use, for example, operation 121 (FIG. 1) and/or controller 224 may use, for example, operation 214 (FIG. 2) to determine a developer emotion classification to rate the emotional change of the reviewers or developers (320). Controller 120 (FIG. 1) may compare a developer emotion classification generated by operation 121 with a user emotion classification generated by operation 112 to generate a prioritized backlog, and/or controller 224 (FIG. 2) may use operation 226 to compare the developer emotion classification generated by operation 214 with a user emotion classification received by controller 224 to generate a prioritized backlog (322).

FIG. 3 describes various operations in a particular order for the purpose of illustration only, and the various operations may be conducted in sequences different from that illustrated. For example, to the extent that various processes and procedures are discussed or conducted with reference to FIGS. 1 and 2 in sequences which may differ from that presented at FIG. 3, the operations of FIG. 3 may be conducted in such alternate sequences. Other sequential variations may be envisioned within this disclosure.

Figure 4:
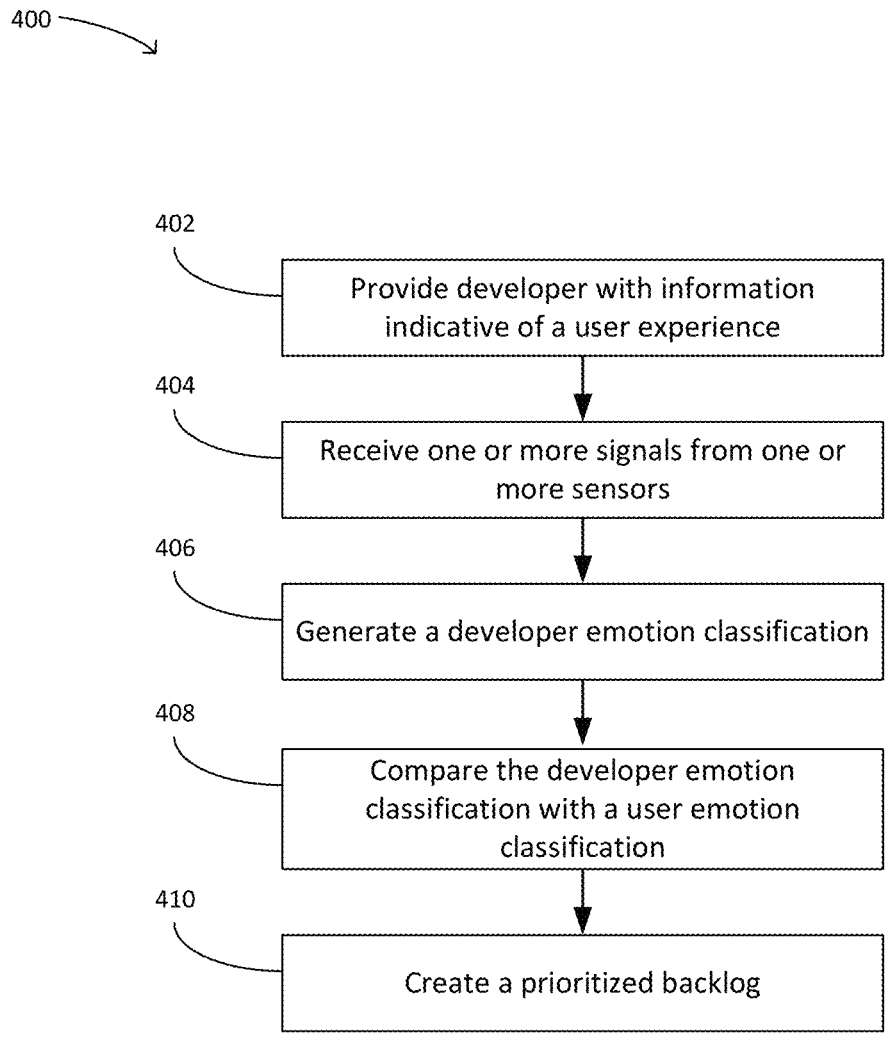
FIG. 4 illustrates an example method for producing a prioritized backlog.

FIG. 4 illustrates a computer-implemented method 400 for using system 100 (FIG. 1) or system 200 (FIG. 2). Device 116 (FIG. 1) may provide information indicative of the user experience of user 101 to a developer 125, as sensors 117 sense physiological markers of developer 125, and/or device 232 (FIG. 2) may provide information indicative of the user experience of user 101 as sensors 202 sense physiological markers of a developer (402). The developer may be provided with the indicative information in a substantially similar manner as the user using the device or application. The indicative information may comprise descriptive information which reproduces or recreates sensorial information received by a user such as user 101 (FIG. 1) and perceived through one or more sensorial capacities of the user while the user conducts an assigned activity. To receive the indicative information in a substantially similar manner, a developer such as developer 125 (FIG. 1) may be provided with the indicative information in a manner intended to reproduce or recreate the sensorial information received by the user while the user conducted the assigned activity, where the developer additionally perceives the indicative information using the one or more sensorial capacities employed by the user. The developer may be provided with the indicative information using a device such as device 116 (FIG. 1) and/or device 232 (FIG. 2) configured to require the developer to utilize the one or more sensorial capacities employed by the user to receive the sensorial information.

Sensors 117 (FIG. 1) may provide signals to data storage system 106, and/or sensors 202 (FIG. 2) may provide signals to data storage system 210 (404). The one or more sensors may be indicative of one or more physiological markers of the developer as the developer is provided with the indicative information. Sensors 117 (FIG. 1) and/or sensors 202 (FIG. 2) may be configured to capture data indicative of, for example, respiration, heart rate, blood pressure, temperature, perspiration, skin conductivity, or any other suitable physiological marker of a developer viewing a user experience. The sensors may be configured to be in physical contact with the developer, or may be configured to remain remote from the developer. The sensors may be configured to communicate one or more physiological markers sensed to a controller over a communication link.

Processing system 107 (FIG. 1) and/or controller 224 (FIG. 2) may generate a developer emotion classification (406). Processing system 107 and/or controller 224 may be configured to perform a cognitive analysis based on the signals received from the one or more sensors 117 and/or 202 to generate the developer emotion classification. The cognitive analysis may classify the developer emotion responses using any appropriate emotion ontology (e.g., neutral state, surprise, happiness, sadness, frustration, anger). Processing system 107 (FIG. 1) and/or controller 224 (FIG. 2) may compare the developer emotion classification with a user emotion classification (408). The user emotion classification may be generated by a user during creation of the user experience and based on sensors such as sensors 103 (FIG. 1) configured to capture data indicative of, for example, respiration, heart rate, blood pressure, temperature, perspiration, skin conductivity, or any other suitable physiological marker of a user conducting an assigned activity.

Controller 120 (FIG. 1) may compare a developer emotion classification generated by operation 121 with a user emotion classification generated by operation 112 to generate a prioritized backlog, and/or controller 224 (FIG. 2) may use operation 226 to compare the developer emotion classification generated by operation 214 with a user emotion classification received by controller 224 to generate a prioritized backlog (410). The prioritized backlog may be based on the comparison of the developer emotion classification and the user emotion classification. The comparison may identify particular points of interest on the prioritized backlog where emotion responses between the user and the developer are in common, or where emotion responses between the user and the developer differ.

Figure 5:
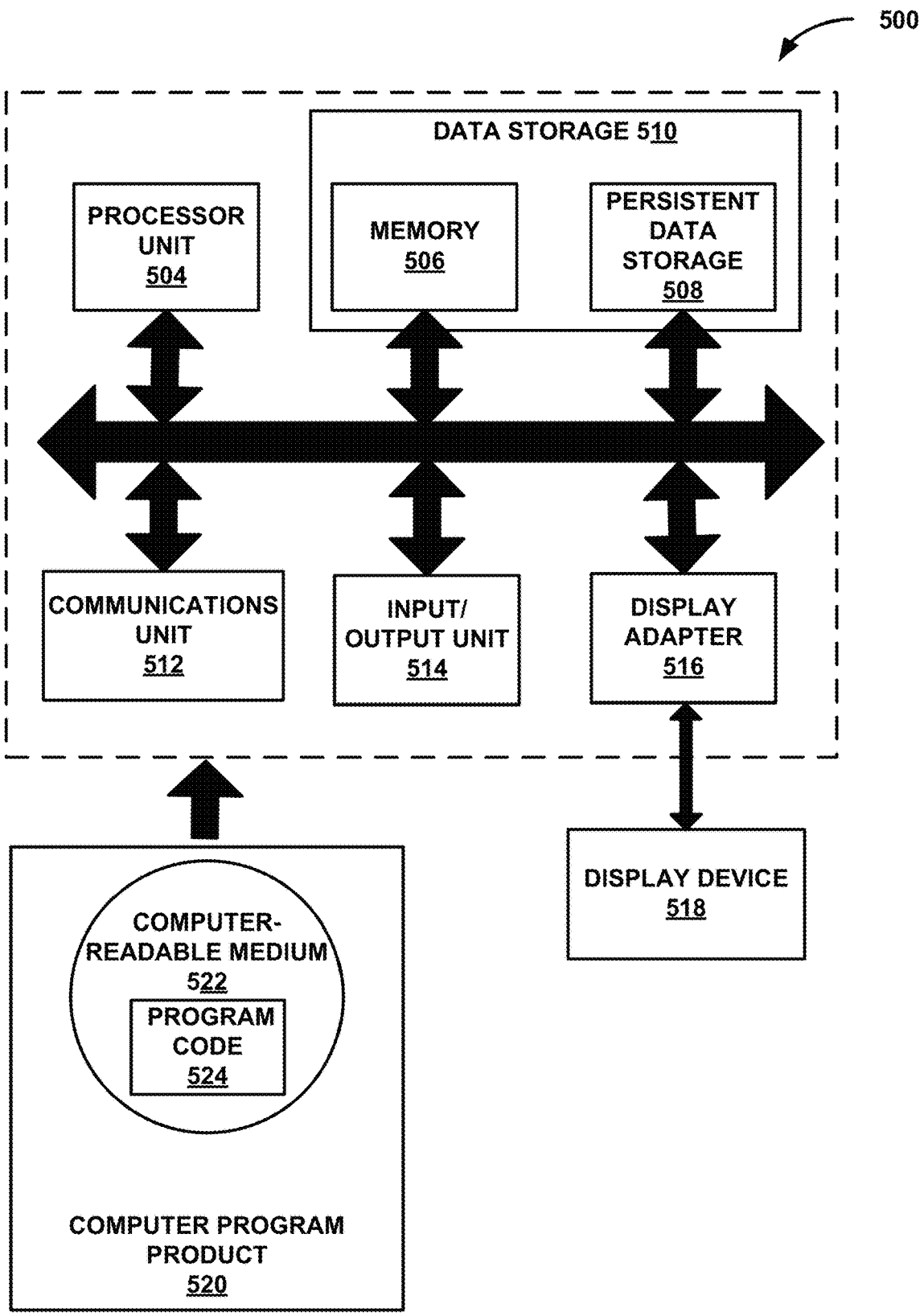
FIG. 5 illustrates an example computing system.

FIG. 5 is a block diagram of a device 500, in accordance with an example of this disclosure. Device 500 may be an example of processing system 107 as depicted in FIG. 1, controller 224 of FIG. 1, or may be an example of a computing device in a network configured to perform the some or all of the operations of processing system 107 or controller 224. Device 500 may also be any server configured to perform the some or all of the operations of processing system 107 or controller 224, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a device 500 may include a computer having capabilities or formats other than or beyond those described herein.

The following is an example description of device 500. It should be understood that device 500 need not include all of these components. For instance, in examples where device 500 is some examples of processing system 107 or controller 224, device 500 may not include display adapter 516 and display device 518. Similarly, in examples where device 500 is a server of an IoT network, device 500 may not include display adapter or display device 518. Also, the computing resources of processor unit 504 and the storage capabilities of data storage 510 may be different in examples where device 500 is processing system 107 as compared to examples where device 500 is controller 224.

In the illustrative example of FIG. 5, device 500 includes communications fabric 502, which provides communications between processor unit 504, memory 506, persistent data storage 508, communications unit 512, and input/output (I/O) unit 514. Communications fabric 502 may include a dedicated system bus, a general system bus, multiple buses arranged in hierarchical form, any other type of bus, bus network, switch fabric, or other interconnection technology. Communications fabric 502 supports transfer of data, commands, and other information between various subsystems of device 500.

Processor unit 504 may be a programmable central processing unit (CPU) configured for executing programmed instructions stored in memory 506. In another illustrative example, processor unit 504 may be implemented using one or more heterogeneous processor systems in which a main processor is present with secondary processors on a single chip. In yet another illustrative example, processor unit 504 may be a symmetric multi-processor system containing multiple processors of the same type. Processor unit 504 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 504 may include a multi-core processor, such as a dual core or quad core processor, for example. Processor unit 504 may include multiple processing chips on one die, and/or multiple dies on one package or substrate, for example. Processor unit 504 may also include one or more levels of integrated cache memory, for example. In various examples, processor unit 504 may comprise one or more CPUs distributed across one or more locations.

Data storage 510 includes memory 506 and persistent data storage 508, which are in communication with processor unit 504 through communications fabric 502. Memory 506 can include a random access semiconductor memory (RAM) for storing application data, i.e., computer program data, for processing. While memory 506 is depicted conceptually as a single monolithic entity, in various examples, memory 506 may be arranged in a hierarchy of caches and in other memory devices, in a single physical location, or distributed across a plurality of physical systems in various forms. While memory 506 is depicted physically separated from processor unit 504 and other elements of device 500, memory 506 may refer equivalently to any intermediate or cache memory at any location throughout device 500, including cache memory proximate to or integrated with processor unit 504 or individual cores of processor unit 504.

Persistent data storage 508 may include one or more hard disc drives, solid state drives, flash drives, rewritable optical disc drives, magnetic tape drives, or any combination of these or other data storage media. Persistent data storage 508 may store computer-executable instructions or computer-readable program code for an operating system, application files comprising program code, data structures or data files, and any other type of data. These computer-executable instructions may be loaded from persistent data storage 508 into memory 506 to be read and executed by processor unit 504 or other processors. Data storage 510 may also include any other hardware elements capable of storing information, such as, for example and without limitation, data, program code in functional form, and/or other suitable information, either on a temporary basis and/or a permanent basis.

Persistent data storage 508 and memory 506 are examples of physical, tangible, non-transitory computer-readable data storage devices. Data storage 510 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 504 can also be suitably programmed to read, load, and execute computer-executable instructions or computer-readable program code. This program code may be stored on memory 506, persistent data storage 508, or elsewhere in device 500. This program code may also take the form of program code 524 stored on computer-readable medium 522 (e.g., a computer-readable storage medium) comprised in computer program product 520, and may be transferred or communicated, through any of a variety of local or remote means, from computer program product 520 to device 500 to be enabled to be executed by processor unit 504.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 504 can be suitably programmed to read, load, and execute instructions of the operating system.

Communications unit 512, in this example, provides for communications with other computing or communications systems or devices. Communications unit 512 may provide communications through the use of physical and/or wireless communications links. Communications unit 512 may include a network interface card for interfacing with a network, an Ethernet adapter, a Token Ring adapter, a modem for connecting to a transmission system such as a telephone line, or any other type of communication interface. Communications unit 512 can be used for operationally connecting many types of peripheral computing devices to device 500, such as printers, bus adapters, and other computers. Communications unit 512 may be implemented as an expansion card or be built into a motherboard, for example.

The input/output unit 514 can support devices suited for input and output of data with other devices that may be connected to device 500, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 514 may also include any type of interface for video output in any type of video output protocol and any type of monitor or other video display technology, in various examples. It will be understood that some of these examples may overlap with each other, or with example components of communications unit 512 or data storage 510. Input/output unit 514 may also include appropriate device drivers for any type of external device, or such device drivers may reside elsewhere on device 500 as appropriate.

Device 500 also includes a display adapter 516 in this illustrative example, which provides one or more connections for one or more display devices, such as display device 518, which may include any of a variety of types of display devices. It will be understood that some of these examples may overlap with example components of communications unit 512 or input/output unit 514. Input/output unit 514 may also include appropriate device drivers for any type of external device, or such device drivers may reside elsewhere on device 500 as appropriate. Display adapter 516 may include one or more video cards, one or more graphics processing units (GPUs), one or more video-capable connection ports, or any other type of data connector capable of communicating video data, in various examples. Display device 518 may be any kind of video display device, such as a monitor, a television, or a projector, in various examples.

Input/output unit 514 may include a drive, socket, or outlet for receiving computer program product 520, which comprises a computer-readable medium 522 having computer program code 524 stored thereon. For example, computer program product 520 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 522 may include any type of optical, magnetic, or other physical medium that physically encodes program code 524 as a binary series of different physical states in each unit of memory that, when read by device 500, induces a physical signal that is read by processor unit 504 that corresponds to the physical states of the basic data storage elements of computer-readable medium 522, and that induces corresponding changes in the physical state of processor unit 504. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 504, thereby physically causing or configuring processor unit 504 to generate physical outputs that correspond to the computer-executable instructions, in a way that causes device 500 to physically assume new capabilities that it did not have until its physical state was changed by loading the executable instructions comprised in program code 524.

In some illustrative examples, program code 524 may be downloaded over a network to data storage 510 from another device or computer system for use within device 500. Program code 524 comprising computer-executable instructions may be communicated or transferred to device 500 from computer-readable medium 522 through a hard-line or wireless communications link to communications unit 512 and/or through a connection to input/output unit 514. Computer-readable medium 522 comprising program code 524 may be located at a separate or remote location from device 500, and may be located anywhere, including at any remote geographical location anywhere in the world, and may relay program code 524 to device 500 over any type of one or more communication links, such as the Internet and/or other packet data networks. The program code 524 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 524 may be transmitted from a source computer-readable medium 522 over non-tangible media, such as communications links or wireless transmissions containing the program code 524. Program code 524 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to device 500.

Various examples have been described. These and other examples are within the scope of the following claims.

What is claimed is:

1. A system comprising:
one or more sensors configured to measure physiological markers; and
a controller configured to:
provide a virtual reality simulation and a user prioritized report to a developer,
wherein the virtual reality simulation comprises a simulated activity that is from a point of view of a user performing an activity using a device or application,
wherein the simulated activity reproduces for the developer a same sensorial information as provided to the user while performing the simulated activity, and
wherein the user prioritized report comprises a user emotion classification of positive to negative emotional responses of the user at a first set of time points when performing the activity, time points in the first set of time points corresponding to performance of portions of the activity;
receive one or more signals indicative of one or more physiological markers of the developer from the one or more sensors at a second set of time points as the developer performs the simulated activity,
wherein the second set of time points corresponds to the first set of time points, corresponding time points of the first set and the second set pertaining to a same portion in the simulated activity;
analyze the one or more signals indicative of the one or more physiological markers to identify a set of emotional responses of the developer at the second set of time points while performing the simulated activity;
generate, based on the identified set of emotional responses, a developer emotion classification;
compare the developer emotion classification with the user emotion classification to identify similarities between an emotional response of the user at a first time point of the first set of time points and a corresponding emotional response of the developer at a second time point of the second set of time points, the first time point and the second time point pertaining to the same portion in the simulated activity; and output a prioritized backlog based on the comparison of the developer emotion classification with the user emotion classification,
wherein the prioritized backlog comprises at least one portion of the simulated activity where the emotional response of the developer is classified as the same emotional response as the user when performing the activity,
wherein the prioritized report includes the prioritized backlog, and
wherein the prioritized report provides to the developer a list of one or more portions of the activity using the device or application that invoked the same emotion classification in both the user and the developer.

2. The system of claim 1 further comprising a user interface, wherein the controller is configured to:
generate an initial emotion classification based on the received one or more signals;
display the initial emotion classification on a user interface;
validate the initial emotion classification based on inputs to the user interface provided by the developer; and
generate the developer emotion classification based on the validation.

3. The system of claim 1,
wherein the controller is configured to determine one or more emotion responses of the user associated with specific portions of the user emotion classification, and
wherein the controller is further configured to provide the prioritized backlog based on the determined one or more emotion responses of the user.

4. The system of claim 1 further comprising:
a recording device;
a processor configured to;
record the user performing the activity using the recording device;
receive at least one signal from at least one sensor while the user performs the activity, wherein the at least one signal is indicative of a physiological marker of the user;
generate an initial emotion classification based on the received at least one signal;
coordinate with the user to validate the initial emotion classification and generate the user emotion classification;
create the prioritized report based on the user emotion classification; and
output the prioritized backlog using the prioritized report.

5. The system of claim 4, wherein the one or more physiological markers of the developer include the physiological marker of the user.

6. The system of claim 1, wherein the processor is configured to:
alter the virtual reality simulation based on the prioritized backlog;
provide the altered virtual reality simulation to the user;
receive at least one signal from a specific sensor while the user is provided with the altered virtual reality simulation, wherein the specific signal is indicative of a physiological marker of the user;
generate a revised emotion classification based on the received specific signal;
compare the revised emotion classification with the user emotion classification; and provide an effectiveness of the altered virtual reality simulation based on the comparison of the revised emotion classification and the user emotion classification.

7. The system of claim 1 wherein the controller is configured to:
interpret a plurality of developer emotion responses using the received one or more signals indicative of the one or more physiological markers of the developer as the developer performs the simulated activity;
index each developer emotion response to a specific portion of the virtual reality simulation provided to the developer, thereby generating a plurality of indexed developer responses; and
generate the developer emotion classification based on the plurality of indexed developer responses.

8. The system of claim 7 wherein the user emotion classification generated by the user comprises a plurality of indexed user responses, wherein each indexed user response is a user emotion response indexed to a particular portion of the virtual reality simulation, and wherein the controller is configured to compare the developer emotion classification and the user emotion classification by comparing the plurality of indexed developer responses and the plurality of indexed user responses.

9. The system of claim 1 wherein the controller is configured to:
interpret a plurality of developer emotion responses using the received one or more signals indicative of the one or more physiological markers of the developer as the developer performs the simulated activity;
categorize each developer emotion response into a distinct emotion, wherein the distinct emotion comprises a plurality of distinct emotions; and
compare the developer emotion classification with the user emotion classification by comparing the distinct emotion of each developer emotion response with a distinct emotion of a user emotion response,
wherein the user emotion classification comprises a plurality of user emotion responses, and
wherein each user emotion response is categorized as one of the distinct emotions comprising the plurality of distinct emotions.

10. The system of claim 1, further comprising at least one of a camera configured to communicate an image to the controller, a wearable sensor configured to communicate a signal indicative of a specific physiological marker to the controller, or a remote sensor configured to observe a subject and communicate a signal indicative of a particular physiological marker to the controller.

11. The system of claim 1, wherein the one or more physiological markers is at least one of a heart rate, a breathing rate, an eye movement, a skin conductance, a temperature, a respiratory rate, a facial expression, a voice amplitude, or a voice pitch.

12. The system of claim 1, wherein the at least one emotional response is a negative emotional response experienced by both the developer and the user.

13. The system of claim 1, wherein the sensorial information includes visual, aural, or haptic information.

14. A system comprising:
one or more sensors configured to measure physiological markers;
a user interface; and
a controller configured to:
provide a virtual reality simulation and a user prioritized report to a developer, wherein the virtual reality simulation comprises a simulated activity that is from a point of view of a user performing an activity using a device or application, wherein the simulated activity reproduces for the developer a same sensorial information as provided to the user while performing the simulated activity, and wherein the user prioritized report comprises a user emotion classification of positive to negative emotional responses of the user at a first set of time points when performing the activity, time points in the first set of time points corresponding to performance of portions of the activity;

receive one or more signals indicative of one or more physiological markers of the developer from the one or more sensors at a second set of time points as the developer performs the simulated activity, wherein the second set of time points corresponds to the first set of time points, corresponding time points of the first set and the second set pertaining to a same portion in the simulated activity;

analyze the one or more signals indicative of the one or more physiological markers to identify a set of emotional responses of the developer at the second set of time points while performing the simulated activity;

generate an initial emotion classification based on the identified set of emotional responses;

validate the initial emotion classification based on inputs to the user interface provided by the developer;

generate a developer emotion classification based on the validation of the initial emotion classification;

compare the developer emotion classification with the user emotion classification generated by the user during the interaction with the device or application to identify similarities between an emotional response of the user at a first time point of the first set of time points and a corresponding emotional response of the developer at a second time point of the second set of time points, the first time point and the second time point pertaining to the same portion in the simulated activity; and output a prioritized backlog based on the comparison of the developer emotion classification and the user emotion classification, wherein the prioritized backlog comprises at least one portion of the simulated activity where the emotional response of the developer is classified as the same emotional response as the user when performing the activity, wherein the prioritized report includes the prioritized backlog, and wherein the prioritized report provides to the developer a list of one or more portions of the activity using the device or application that invoked the same emotion classification in both the user and the developer.

15. The system of claim 14 wherein the user emotion classification is based on a physiological marker of the user as the user interacts with the device or application, wherein the one or more physiological markers of the developer include the physiological marker of the user.

16. The system of claim 14, wherein the processor is configured to:

alter the virtual reality simulation based on the prioritized backlog;

provide the altered virtual reality simulation to the user;

receive at least one signal from a specific sensor while the user is provided with the altered virtual reality simulation, wherein the specific signal is indicative of a physiological marker of the user;

generate a revised emotion classification based on the received specific signal;

compare the revised emotion classification with the user emotion classification; and provide an effectiveness of the altered virtual reality simulation based on the comparison of the revised emotion classification and the user emotion classification.

17. The system of claim 14, wherein the sensorial information includes visual, aural, or haptic information.

18. A computer-implemented method comprising:

receiving visual data and a first set of physiological data of a user performing an activity, wherein the visual data and the first set of physiological data is generated by a camera and a first set of sensors, respectively;

analyzing the visual data and the first set of physiological data to identify emotional responses of the user while performing the activity;

generating, based on the analyzing, a prioritized report comprising a user emotion classification of the emotional responses of the user at a first set of time points when performing the activity, each time point in the first set of time points corresponding to a portion of the activity;

generating, based on the visual data and the prioritized report, a virtual reality simulation that comprises a simulated activity, wherein the simulated activity is from a point of view of the user performing the activity at the first set of time points;

receiving a second set of physiological data from a second set of sensors associated with a developer as the developer performs the simulated activity while viewing the virtual reality simulation;

analyzing the second set of physiological data to identify emotional responses of the developer while performing the simulated activity;

generating, based on the analyzing the second set of physiological data, a developer emotion classification of the emotional responses of the developer at a second set of time points when performing the simulated activity, wherein the second set of time points corresponds to the first set of time points, corresponding time points of the first set and the second set pertaining to a same portion in the activity and the simulated activity;

comparing the developer emotion classification and the user emotion classification to identify similarities between an emotional response of the user at a first time point of the first set of time points and a corresponding emotional response of the developer at a second time point of the second set of time points, the first time point and the second time point pertaining to the same portion in the simulated activity; and outputting, based on the comparing, a prioritized backlog comprising at least one portion from the simulated activity where at least one emotional response of the user and the developer are classified as a same emotion, wherein the prioritized backlog provides to the developer a list of one or more portions of the activity that invoked the same emotion classification in both the user and the developer.

19. The system of claim 12, wherein the negative emotional response is indicative of a problem at one or more steps required for completing the simulated activity.

* * * * *